United States Patent Office 2,972,646
Patented Feb. 21, 1961

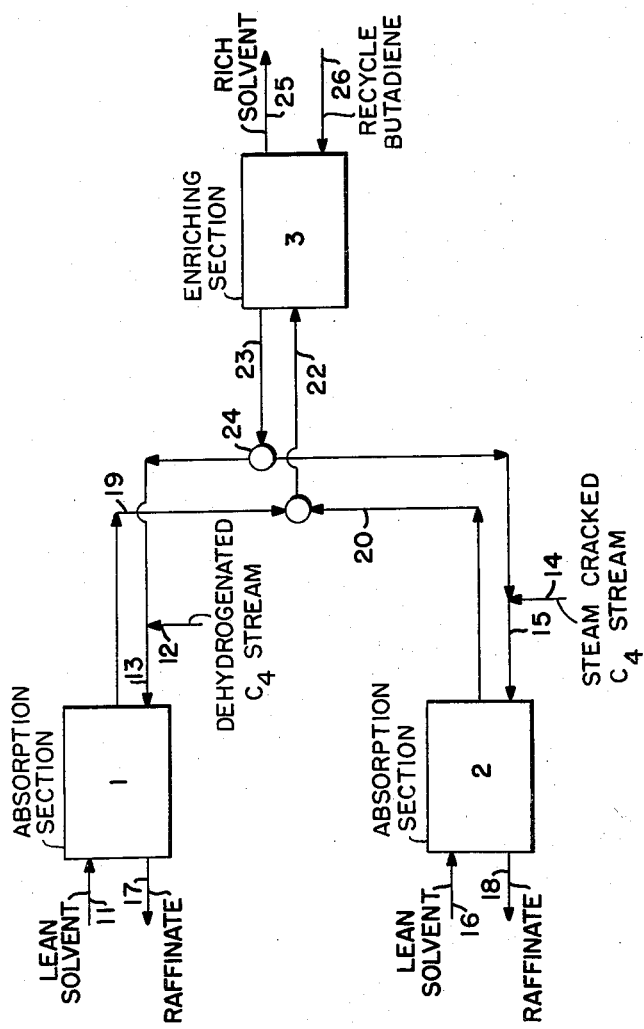
Robert P. Cahn
Earle R. Gurtler   Inventors
By *Seymour Stahl*   Attorney

2,972,646

SEPARATION OF BUTADIENE

Robert P. Cahn, Elizabeth, N.J., and Earle R. Gurtler, Baytown, Tex., assignors to Esso Research and Engineering Company, a corporation of Delaware Filed July 29, 1958, Ser. No. 751,720

5 Claims. (Cl. 260—681.5)

This invention relates to a process for separating in essentially pure form a component from two or more streams containing it. More particularly, this invention relates to the extraction of an organic compound from two or more streams containing said compound as a common component but otherwise differing in composition by a staged extraction process which requires individual extraction units and a combined enriching section.

Although the process of this invention is amenable to the extraction of various compounds from mixtures, such as olefins from paraffins, diolefins from olefins, acetylenes from diolefins, aromatics from paraffins, for ease of description reference will be had to the extraction of butadiene from $C_4$ hydrocarbon streams. As the selective solvent, aqueous cuprous ammonium acetate will be referred to as CAA. While there are many sources of butadiene, for purpose of description there will be considered a $C_4$ fraction obtained by steam cracking hydrocarbons in accordance with known procedures and this fraction will be referred to herein as the steam cracked $C_4$ stream. As a second butadiene comprising stream, there will be employed a butadiene containing $C_4$ fraction obtained by dehydrogenating the normal butylenes in a catalytically cracked $C_4$ stream from which the isobutane and isobutylene have been essentially removed and this stream will be referred to herein as the dehydrogenated $C_4$ stream. This dehydrogenated $C_4$ stream, for example, can also be derived from the catalytic dehydrogenation of a normal butane stream, or a mixed n-butane/n-butene cut. While the intended purpose of this invention is to extract the butadiene from both streams, it is to be understood that the composition of the streams vary considerably. Both streams will contain the desired butadiene; however, the steam cracked $C_4$ stream will contain substantial amounts of isobutylene whereas the dehydrogenated $C_4$ stream will contain little or no isobutylenes. Also the steam cracked $C_4$ stream will contain little or no butanes, whereas the dehydrogenated $C_4$ stream may comprise substantial amounts of these paraffins. Generally, the steam cracked $C_4$ stream will comprise a higher concentration of butadiene than the dehydrogenated $C_4$ stream. Typical compositions of these two streams are set forth in Table I.

TABLE I

| Component | Steam Cracked, Wt. Percent | | Dehydrogenated, Wt. Percent | |
|---|---|---|---|---|
| | Range | Specific | Range | Specific |
| Isobutylene | 20 to 35 | 25 | 0 to 10 | 2 |
| n-butylene | 30 to 50 | 38 | 20 to 60 | 45 |
| butanes | 0 to 5 | 2 | 0 to 70 | 28 |
| 1,3-butadiene | 25 to 40 | 35 | 10 to 70 | 25 |

Minor to trace amounts of other components such as 1,2-butadiene $C_3$ and $C_5$ hydrocarbons and acetylenes may also be present.

In accordance with the prior art, butadiene may be extracted from either or a combination of these streams in essentially pure form in an extraction unit which comprises an absorption section and an enriching section, each of which may have a plurality of stages, followed by desorption of the rich solvent to recover the extracted pure butadiene. The function of the absorption section is to extract the butadiene in a crude fashion from the $C_4$ feed. By crude fashion it is meant that substantial amounts, e.g. 5–20% on butadiene, of the other hydrocarbons and especially the butylenes are extracted along with the butadiene. The function of the enriching section is to reject the impurities, principally iso- and normal butylenes, to permit a recovery of the rich CAA solution containing relatively pure butadiene, e.g. 99%. More specifically, in a typical CAA extraction process the lean CAA enters the absorption section and passes toward and through the enriching stages while the fresh butadiene bearing stream is admitted into the system preferably between the two sections to effect a countercurrent flow of CAA and butadiene bearing stream. The crude rich CAA from the absorption section containing the bulk of butadienes and some of the butylenes then passes through the enriching section where the butylenes are rejected and passed back to the extraction stages. The rejection is effected by countercurrent contact with a butadiene rich hydrocarbon stream as the CAA solution passes through the enriching sections. This is accomplished in accordance with known techniques. For example, the temperature of the last stage of the enriching section is raised to reject some of the butadiene absorbed in the CAA and the separated butadiene recycled to the earlier enriching stages to acocmplish the stripping.

While the individual streams may of course be extracted in separate units, this procedure is obviously costly from the standpoint of requiring double equipment and additional processing care. On the other hand, if the streams, i.e. the dehydrogenated $C_4$ stream and the steam cracked $C_4$ stream, are mixed for extraction in a single unit, other drawbacks are encountered. For example, the steam cracked $C_4$ feed contains large amounts of normal butylenes which would appear in the raffinate and which would be especially desirable as a feedstock to the dehydrogenation plant after removal of any isobutylenes present, whereas the raffinate from the dehydrogenated $C_4$ stream contains a much lower normal butylene concentration, and combining the two streams for the extraction process would result in a raffinate diluted in normal butylenes and an inferior feed to the dehydrogenation unit. Moreover, the raffinate from the steam cracked $C_4$ feed after CAA extraction contains isobutylene which preferably is removed by dimerization prior to feeding this raffinate to a dehydrogenation unit. By mixing the two streams for the entire process, an additional load on the isobutylene dimerization unit would result.

Removal of isobutylene may be accomplished by a conventional dimerization process such as heat soaking, a sulfuric acid extraction wherein diisobutylene is formed and removed from the stream. Additionally, the raffinate from the dehydrogenated $C_4$ stream is relatively high in alkanes or paraffins as noted from Table I, thus making this raffinate from the dehydrogenated $C_4$ stream a poor feed for the dehydrogenation unit. In other cases, such as n-butane dehydrogenation, it is desirable to recycle the raffinate to the dehydrogenator, but it is imperative to exclude isobutylene and isobutane contaminants from this stream, since they will crack in the dehydrogenation unit.

The present invention solves the aforenoted problems by utilizing an integrated butadiene extraction process wherein the crude butadiene comprising streams are treated separately with lean CAA solution in a series of absorption stages. The rich CAA stream containing the butadiene from both feed streams, as well as the minor amounts of butylene impurities are then mixed and passed as a single rich CAA stream to a common enriching section of the extraction process. The butylenes rejected in the enriching section together with required amounts of butadiene, e.g. a hydrocarbon phase containing 20–50% butylenes, 80–50% butadiene, are recycled to the individual absorption sections in a controlled manner to maintain the desirable ratios of butadiene and butylenes in the individual absorption sections. For a clearer understanding of the process, reference may now be had to the figure which is a simplified diagrammatic flow plan of the process of this invention.

In the figure, unit 1 represents the absorption stage or stages in an overall butadiene extraction unit. A single absorption stage will comprise a settler together with a mixer, agitator, or pump such as described and shown in U.S. patent to Packie U.S. Patent No. 2,420,906. A tower may also be used.

It is to be understood that the number of stages employed in the particular unit is a matter of choice depending on the degree purity product desired.

Absorption section 1 is intended to treat a single stream such as that obtained by dehydrogenating $C_4$ hydrocarbons. The absorption section 2 is similar to that of 1 containing at least one stage and having either the same or different number of stages as section 1. Diagrammatically, 3 represents the enriching section of one or more stages and each stage will similarly comprise a settler, a mixer or agitator, and a pump. In the enriching section there may be employed extraneous heating means to aid in the rejection of butylenes as desired. In the last enriching stage, where this heating is usually done, no mixed is required. Lean CAA is passed into the absorption section 1 via line 11 and a dehydrogenated $C_4$ stream comprising butadiene is passed countercurrently through 1 via lines 12 and 13. Similarly, a steam cracked $C_4$ feed is passed into unit 2 via lines 14 and 15 countercurrently to the lean CAA solution entering via line 16.

As the lean CAA solution contacts the butadiene containing streams, substantially all of the butadiene is absorbed or extracted together with some butylenes, the amount depending on the concentration, i.e. ratio of butadiene to butylene in the feed. From section 1, a raffinate comprising principally n-butylenes and $C_4$ paraffins is removed via line 17. From section 2, there is removed as raffinate via line 18 a hydrocarbon stream comprising principally n-butylenes and isobutylene. As previously noted, the hydrocarbon stream exiting via line 18 may be passed to a dimerization unit to separate isobutylenes, and the remaining substantially pure butylene may then be recycled to a dehydrogenation unit not shown. The rich CAA streams exiting absorption sections 1 and 2 via lines 19 and 20 are passed via line 22 into the enriching section 3. By recycling essentially pure butadiene via line 26 countercurrent to the CAA flow, the non-butadiene hydrocarbons entering the enriching section 3 are rejected and recycled or refluxed via line 23 to absorption sections 1 and 2. Valve 24 controls the proportions of the rejected $C_4$ material from the enriching section which enter each of the absorption sections 1 and 2, to permit an extremely high degree of control over the butadiene concentrations as well as the butylene and paraffin concentrations in the individual absorption sections. If desired, 50% of the stream from the enriching section may be fed into section 1 and 50% into section 2. The amounts of reflux to units 1 and 2 may be adjusted in any ratio desired. It is to be understood that the size of the equipment may limit the proportioning of the reflux during actual operation. Finally, rich CAA solution exits the enriching section via line 25 and contains relatively pure butadiene, e.g. 99%. The purity and butadiene recovery is dependent, as previously noted, on the number of stages, ratio CAA to hydrocarbon, temperature, amount of butadiene reflux, and the like, and all variables which are known in the prior art to affect purity in this general process. The butadiene is then desorbed from the rich CAA by heat, e.g. 150–200° F. in accordance with known techniques, or by stripping with an inert solvent, such as hexane.

The following Table II sets forth operating conditions for two specific examples, showing compositions of the streams at key points in the process. It is to be understood that the amounts of the two $C_4$-streams can be any quantities. If desired, more than two $C_4$-streams can be treated by the method described. Composition of the $C_4$-streams can vary over wide ranges, with a butadiene content from less than 1% to above 95%. The diluent $C_4$-constituents can be any mixture of normal and isobutanes and butylenes. The CAA rates required for the extraction will, of course, depend on the quantities of the streams involved and on the concentration of butadiene in these streams. The composition of the CAA solvent used in this example is as follows:

*Composition of typical CAA solution*

Water _____ 47.4 wt. percent or $NH_3$ 11.0 mols/liter
Ammonia _____ 15.6 wt. percent or $Cu^+$ 3.0 mols/liter
Copper _____ 17.6 wt. percent* or $Cu^{++}$ 0.2 mols/liter
Acetic acid _____ 20.0 wt. percent or $HA_c$ 4.0 mols/liter
Specific gravity=1.2 g./cc.

\* About 5–10% as cupric ion, remainder cuprous.

TABLE II

| Stream No. | 11 | 12 | 16 | 14 | 17 | 18 | 13 [3] | 15 [3] | 22 | 26 |
|---|---|---|---|---|---|---|---|---|---|---|
| Temperature | 90 | 85 | 90 | 85 | 70 | 70 | 26 | 26 | 23 | 80 |
| Flow rate, b./s.d.[1] | 13,000 | 2,200 | 2,900 | 410 | 1,705 | 276 | 260 | 65 | 16,854 | 500 |
| Composition,[2] mol percent: | | | | | | | | | | |
| Isobutane | | 12 | | 1 | 16 | 1 | | | | |
| Normal butane | | 16 | | 1 | 21 | 2 | | | | |
| Isobutylene | | 2 | | 25 | 3 | 38 | 11 | 11 | 4 | |
| Normal butylene | | 45 | | 38 | 59 | 58 | 18 | 18 | 7 | 1 |
| Butadiene | | 25 | | 35 | 1 | 1 | 71 | 71 | 89 | 99 |
| Mols butadiene per 1,000 gals. CAA | 0.06 | | 0.06 | | | | | | 5.2 | |

[1] Total flow rate (barrels per day).
[2] Hydrocarbon portion only.
[3] Either (13) or (15) could be from 0 to 325 b./s.d.

TABLE II (a)

| Stream No. | 11 | 12 | 16 | 14 | 17 | 18 | 13 [3] | 15 [3] | 22 | 26 |
|---|---|---|---|---|---|---|---|---|---|---|
| Temperature | 90 | 85 | 90 | 85 | 70 | 70 | 28 | 28 | 25 | 80 |
| Flow rate, b./s.d.[1] | 5,900 | 1,000 | 8,500 | 1,200 | 775 | 807 | 120 | 190 | 15,327 | 480 |
| Composition,[2] mol percent: | | | | | | | | | | |
| Isobutane | | 12 | | 1 | 16 | 1 | | | | |
| Normal butane | | 16 | | 1 | 21 | 2 | | | | |
| Isobutylene | | 2 | | 25 | 3 | 38 | 9 | 9 | 3 | |
| Normal butylene | | 45 | | 38 | 59 | 58 | 15 | 15 | 5 | 1 |
| Butadiene | | 25 | | 35 | 1 | 1 | 76 | 76 | 92 | 99 |
| Mols butadiene per 1,000 gals. CAA | 0.06 | | 0.06 | | | | | | 5.7 | |

[1] Total flow rate (barrels per day).
[2] Hydrocarbon portion only.
[3] Either (13) or (15) could be from 0 to 325 b./s.d.

While the aforesaid description related specifically to the extraction of butadiene from various $C_4$ hydrocarbon streams containing it, this process has obvious applicability to other separation techniques and it is intended that the recitation of the butadiene extraction process is merely an example of one such process.

Other separations amenable to this process include the separation of aromatics from other hydrocarbons with known selective solvents such as aqueous diethylene glycol, dipropylene glycol, or a mixture of the two, liquid $SO_2$, phenol and the like. More particularly, aromatics may be separated from paraffinic or olefinic hydrocarbons. As an example, a typical hydroforming process will result in a fraction comprising aromatics and paraffins, whereas a steam cracking process may result in a mixture comprising aromatics and olefins. These two compositions may be treated in accordance with the process described above to obtain separate raffinate streams, one being paraffinic and the other being olefinic in nature. The extraction conditions, such as solvent to hydrocarbon ratio, temperatures, pressures, and the like are well known in the art and the proportionment of the reflux from the enriching section to the absorption section is controlled as desired.

Another general process which is applicable to the present invention relates to liquid ammonia extraction wherein liquid ammonia is passed countercurrently to a mixed hydrocarbon stream for the selective extraction of a desired component.

A further general process is the separation of metal salts and metal-organic complexes from aqueous solutions by selective organic solvents, for example, the recovery of uranium isotopes. The process can be used for the extraction of the desired constituent from several streams without the need of mixing the various streams and thus avoiding contamination, such as the introduction of radio-active isotopes into non-radio-active streams.

It is to be understood that in each process the known conditions for extracting the desired component will preferably be employed in the absorption section. The proportioning of the reflux to the individual absorption sections is dictated by the predetermined composition of the raffinate streams, thus undesirable constituents present in one stream may be excluded from the other.

What is claimed is:

1. A process for extracting butadiene from at least two butadiene-containing streams of different composition, which comprises countercurrently contacting each butadiene-containing stream in separate absorption zones with a cuprous ammonium acetate solvent in countercurrent flow to the streams to obtain separate rich extracts containing butadiene and in addition impurities absorbed by said solvent, combining the rich extracts and passing the mixed rich extract through an enriching section, concomitantly passing in countercurrent flow to said mixed rich extract substantially pure butadiene to strip said impurities from the combined rich extracts, recovering a rich extract containing butadiene substantially free of said impurities, withdrawing a butadiene stream containing said stripped impurities from said enriching section and recycling said impurities-containing butadiene stream to at least one of the absorption zones and recovering at least two raffinate streams of different composition from said absorption zones.

2. A process in accordance with claim 1 wherein one of said streams of different compositions contains isobutylene and the other substantially no isobutylene and wherein one of said raffinate streams is essentially isobutylene free.

3. A process for extracting butadiene from two butadiene-containing streams, the first stream containing substantial quantities of isobutylene and the second stream containing substantially no isobutylene, which comprises countercurrently contacting each butadiene-containing streams in separate absorption zones with a cuprous ammonium acetate solvent to obtain separate rich extracts containing butadiene and in addition impurities absorbed by said solvent, combining the rich extracts and passing the mixed rich extract through an enriching section, concomitantly passing in countercurrent flow to said mixed rich extract substantially pure butadiene to strip said impurities comprising isobutylene from said rich extract, recovering a rich extract containing butadiene substantially free of said impurities, recycling butadiene containing said impurities to at least one of said absorption zones, and recovering at least two raffinate streams of different composition from said absorption zones.

4. The process for extracting butadiene from two butadiene-containing streams of different composition which comprises countercurrently contacting each butadiene-containing stream in separate absorption zones with cuprous ammonium acetate solvent, withdrawing cuprous ammonium acetate solvent extract rich in butadiene and in addition containing impurities absorbed by said solvent, combining the withdrawn cuprous ammonium acetate solvent extracts in a common enriching section, countercurrently contacting said combined extracts with substantially pure butadiene to strip said impurities from said combined extracts, withdrawing cuprous ammonium acetate rich in substantially pure butadiene from said enriching zone, stripping the butadiene from the cuprous ammonium acetate withdrawn from the common enriching zone, recycling the stripped cuprous ammonium acetate solvent to said absorption zones, recycling a part of the stripped butadiene to said common enriching zone, withdrawing butadiene containing said impurities from said enriching zone, recycling said withdrawn butadiene containing impurities to at least one of the absorpton zones and recovering raffinate streams from said absorption zones having different compositions.

5. A process in accordance with claim 4 wherein one of said streams of different composition contains substantial quantities of isobutylene and the other contains substantially no isobutylene.

References Cited in the file of this patent

UNITED STATES PATENTS

| | | |
|---|---|---|
| 2,302,130 | Leech | Nov. 17, 1942 |
| 2,386,355 | Schulze et al. | Oct. 9, 1945 |
| 2,420,906 | Packie et al. | May 20, 1947 |
| 2,492,787 | Davis | Dec. 27, 1949 |